(12) United States Patent
Chidlovskii et al.

(10) Patent No.: US 11,373,096 B2
(45) Date of Patent: Jun. 28, 2022

(54) SEMI-SUPERVISED VARIATIONAL AUTOENCODER FOR INDOOR LOCALIZATION

(71) Applicants: NAVER CORPORATION, Gyeonggi-do (KR); NAVER LABS CORPORATION, Seongnam-si (KR)

(72) Inventors: Boris Chidlovskii, Meylan (FR); Leonid Antsfeld, Saint Ismier (FR)

(73) Assignees: NAVER CORPORATION, Gyeonggi-Do (KR); NAVER LABS CORPORATION, Gyeonggi-Do (KR)

(*) Notice: Subject to any disclaimer, the term of this patent is extended or adjusted under 35 U.S.C. 154(b) by 249 days.

(21) Appl. No.: 16/904,693

(22) Filed: Jun. 18, 2020

(65) Prior Publication Data

US 2021/0097387 A1 Apr. 1, 2021

(30) Foreign Application Priority Data

Sep. 26, 2019 (EP) ..................................... 19306204

(51) Int. Cl.
*G01S 3/02* (2006.01)
*H04W 24/00* (2009.01)
(Continued)

(52) U.S. Cl.
CPC .............. *G06N 3/08* (2013.01); *G01C 21/206* (2013.01); *G06K 9/6259* (2013.01);
(Continued)

(58) Field of Classification Search
CPC ...... G06N 3/08; H04B 17/318; G01C 21/206; G06K 9/6259; G06K 9/6267; H04W 64/003
(Continued)

(56) References Cited

U.S. PATENT DOCUMENTS

2003/0043073 A1* 3/2003 Gray ..................... G01S 5/0252
342/465
2010/0090899 A1* 4/2010 Zhao ..................... G01S 5/0263
342/463
(Continued)

FOREIGN PATENT DOCUMENTS

WO WO-2018046412 A1 3/2018
WO WO-2019118644 A1 6/2019

OTHER PUBLICATIONS

A. Belay Adege, H.-P. Lin, G. Berie Tarekegn, and S.-S. Jeng. Applying deep neural network (dnn) for robust indoor localization in multibuilding environment. Applied Sciences, 8:1062, Jun. 2018.
(Continued)

*Primary Examiner* — Mark G. Pannell

(57) ABSTRACT

A method of training a predictor to predict a location of a computing device in an indoor environment incudes: receiving training data including strength of signals received from wireless access points at positions of an indoor environment, where the training data includes: a subset of labeled data including signal strength values and location labels; and a subset of unlabeled data including signal strength values and not including labels indicative of locations; training a variational autoencoder to minimize a reconstruction loss of the signal strength values of the training data, where the variational autoencoder includes encoder neural networks and decoder neural networks; and training a classification neural network to minimize a prediction loss on the labeled data, where the classification neural network generates a predicted location based on the latent variable, and where the encoder neural networks and the classification neural network form the predictor.

22 Claims, 13 Drawing Sheets

(51) Int. Cl.
  G01C 17/38 (2006.01)
  G06N 3/08 (2006.01)
  H04B 17/318 (2015.01)
  G01C 21/20 (2006.01)
  G06K 9/62 (2022.01)
  H04W 64/00 (2009.01)

(52) U.S. Cl.
  CPC ......... G06K 9/6267 (2013.01); H04B 17/318 (2015.01); H04W 64/003 (2013.01)

(58) Field of Classification Search
  USPC .......................................................... 706/25
  See application file for complete search history.

(56) References Cited

U.S. PATENT DOCUMENTS

| | | | | |
|---|---|---|---|---|
| 2016/0371394 | A1* | 12/2016 | Shahidi | H04B 17/3912 |
| 2017/0161635 | A1 | 6/2017 | Oono et al. | |
| 2019/0349715 | A1* | 11/2019 | Ghourchian | H04W 4/02 |
| 2020/0007844 | A1* | 1/2020 | Seo | B60R 1/00 |
| 2020/0309960 | A1* | 10/2020 | Arditi | G01S 19/40 |
| 2022/0066456 | A1* | 3/2022 | Ebrahimi Afrouzi | A47L 9/30 |

OTHER PUBLICATIONS

A. Chriki, H. Touati, and H. Snoussi. Svm-based indoor localization in wireless sensor networks. pp. 1144-1149, Jun. 2017.
A. S. Yoon, T. Lee, Y. Lim, D. Jung, P. Kang, D. Kim, K. Park, and Y. Choi. Semi-supervised learning with deep generative models for asset failure prediction. CoRR, abs/1709.00845, 2017.
A. T. Mariakakis, S. Sen, J. Lee, and K.-H. Kim. SAIL: Single access point-based indoor localization. In Proceedings of the 12th Annual International Conference on Mobile Systems, Applications, and Services, MobiSys '14, pp. 315-328. ACM.
B.-c. M. Suk-hoon Jung and D. Han. Unsupervised learning for crowdsourced indoor localization in wireless networks. IEEE Transactions on Mobile Computing, 15(11):2892-2906, 2016.
C. Zhang, P. Patras, and H. Haddadi. Deep learning in mobile and wireless networking: A survey. CoRR, abs/1803.04311,2018.
D. Han, D. G. Andersen, M. Kaminsky, K. Papagiannaki, and S. Seshan. Access point localization using local signal strength gradient. In S. B. Moon, R. Teixeira, and S. Uhlig, editors, Passive and Active Network Measurement, vol. 5448, pp. 99-108. Springer Berlin Heidelberg.
D. P. Kingma, S. Mohamed, D. J. Rezende, and M. Welling. Semisupervised learning with deep generative models. In Proc. NIPS, pp. 3581-3589, 2014.
E. Mok and G. Retscher. Location determination using WiFi fingerprinting versus WiFi trilateration. Journal of Location Based Services, 1 (2):145-159, 2007.
F. Zafari and A. G. andKin K. Leung. A survey of indoor localization systems and technologies. CoRR, abs/1709.01015, 2017.
J. Bi, Y. Wang, Z. Li, S. Xu, J. Zhou, M. Sun, and M. Si. Fast radio map construction by using adaptive path loss model interpolation in large-scale building. Sensors, 19(3):712, 2019.
J. Torres-Sospedra, R. Montoliu, A. Mart'?nez-US'o, J. P. Avariento, T. J. Arnau, M. Benedito-Bordonau, and J. Huerta. UJIIndoorLoc: A new multi-building and multi-floor database for WLAN fingerprint-based indoor localization problems. In 2014 International Conference on Indoor Positioning and Indoor Navigation (IPIN), pp. 261-270.
J. Yoo and K. H. Johansson. Semi-supervised learning for mobile robot localization using wireless signal strengths. In 2017 International Conference on Indoor Positioning and Indoor Navigation (IPIN), pp. 1-8, 2017.
J. Zhao and J. Wang. Wifi indoor positioning algorithm based on machine learning. In 2017 7th IEEE Intern. Conf. on Electronics Information and Emergency Communication (ICEIEC), pp. 279-283, Jul. 2017.
K. P. Bennett and A. Demiriz. Semi-supervised support vector machines. In Proceedings of the Twenty-Ninth AAAI Conference on Innovative Applications (IAAA), pp. 4670-4677, 2017.
M. Mohammadi, A. Al-Fuqaha, M. Guizani, and J.-S. Oh. Semisupervised deep reinforcement learning in support of IoT and smart city services. IEEE Internet of Things Journal, 5(2):624-635.
M. Nowicki and J. Wietrzykowski. Low-effort place recognition with wifi fingerprints using deep learning. Nov. 2016.
N. Ghourchian, M. Allegue-Martinez, and D. Precup. Real-time indoor localization in smart homes using semi-supervised learning. In Proc. AAAI Conf. on Artificial Intelligence in Innovation, pp. 4670-4677, 2017.
S. H. Jung and D. Han. Automated construction and maintenance of wi-fi radio maps for crowdsourcing-based indoor positioning systems. IEEE Access, 6:1764-1777, 2018.
S. Xia, Y. Liu, G. Yuan, M. Zhu, and Z. Wang. Indoor fingerprint positioning based on wi-fi: An overview. ISPRS Int. J. Geo-Information, 6(5):135, 2017.
T. Pulkkinen, T. Roos, and P. Myllymaki. Semi-supervised learning for WLAN positioning. In Artificial Neural Networks and Machine Learning—ICANN 2011—21st International Conference on Artificial Neural Networks, Part I, pp. 355-362, 2011.
Y. Ning, X. Chenxian, W. Yinfeng, and F. Renjian. A radio-map automatic construction algorithm based on crowdsourcing. Sensors, 16(4), 2016.
Y. Yuan, L. Pei, C. Xu, Q. Liu, and T. Gu. Efficient WiFi fingerprint training using semisupervised learning. In Ubiquitous Positioning Indoor Navigation and Location Based Service (UPINLBS), pp. 148-155, 2014.
European Search Report for European Application No. EP19306204.9 dated Apr. 6, 2020.
Response to European Search Report for European Application No. EP19306204.9 filed Sep. 30, 2021.

* cited by examiner

SEMI-SUPERVISED VARIATIONAL AUTOENCODER FOR INDOOR LOCALIZATION

CROSS-REFERENCE TO RELATED APPLICATIONS

This application claims the benefit of EP Application No. 19306204.9, filed on Sep. 26, 2019. The entire disclosure of the application referenced above is incorporated herein by reference.

FIELD

The present disclosure relates to systems and methods for indoor localization and more particularly to variational autoencoders for indoor localization.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many applications of electronic devices rely on receiving a current position of an electronic device, which may not be easily available in indoor environments (which may be fully enclosed (e.g., within a building or underground cave) or partially enclosed (e.g., within a car park or tunnel)). Indoors, line of sight with satellites, positioning via satellite signals such as global positioning system (GPS), Galileo, or GLONASS global navigation satellite system) may not be available.

Indoor positioning may rely on signals received from wireless access points. To localize a mobile agent or a device, methods of trilateration can be used if three or more locations of nearby Wi-Fi Access Points are known. However, Wi-Fi access point positions may not be available and may not be up-to-date because they may be deployed by multiple different providers. Since a complex indoor environment may include obstacles such as walls and doors, and may include frequently moving objects, the effect of signal multi-path makes trilateration of Wi-Fi signals difficult.

One way to overcome this problem includes employing Wi-Fi fingerprinting for indoor positioning. Wi-Fi fingerprinting involves a list of signal strengths from various access points received at a position and does not rely on knowing the exact location of the access points themselves. Collecting the list of signal strengths may be done in advance, to obtain a radio (or signal) map of the building. For the Wi-Fi fingerprinting to work well, the radio map is made dense and up-to-date. Generating the radio map, however, may be expensive because for indoor positioning the Wi-Fi data may be labeled with geo-tags, for example, a coordinate, a room identifier or a building number.

A reduction of the data collection and annotation effort is desirable.

Semi-supervised machine learning includes training with labeled and unlabeled data and is used in machine learning (ML). Machine learning can be used to reduce offline Wi-Fi data collection. In semi-supervised machine learning, a system is provided with a training set $\{(x_i,y_i), i=1, \ldots n\}$ including tuples of data points $x_i$ and annotations, also called labels, $y_i$, and is additionally provided with unlabeled data points $x_j$. The system infers the best functional relationship $x \to y$ minimizing a prediction error. This problem can also be described as finding a mapping function $F: x \to z$ in a space of a latent variable z, which is smaller than the space of the training set. The best predictor can then be defined as a function of z with parameter $\theta$ such that $f_\theta(z) = \mathrm{argmax}_y p(y|z,\theta)$.

Semi-supervised learning can be considered supervised learning augmented with information on the distribution of the underlying dataset provided by the unlabeled data. Even though unlabeled data may not be used to explicitly train the predictor with the prediction goal, unlabeled data can improve the prediction of a predicator because it can be assumed that if two data points are close in a high density region, their respective predictions should also be close. Equivalently, if data points are in the same cluster of the distribution of data points, they are likely to be close in the space of annotations, such as having the same class label as annotation.

Variational autoencoders, VAEs, are a class of stochastic generative models implemented as deep neural networks. VAEs simultaneously train a probabilistic encoder neural network and a decoder neural network. VAEs involve drawing a sample of a latent variable z, from a uniform prior distribution p(z). The space of latent variables may be of a smaller dimension that the input and output of the VAEs. The sample z is put through the decoder neural network to reconstruct an original input.

VAEs aim to learn the Bayesian posterior distribution over the latent variable $$p_\theta^{exact}(z|x) = \frac{p_\theta(x|z)p(z)}{p_\theta(x)},$$

which however is not a tractable expression. VAEs employ variational inference to approximate $p_\theta^{exact}$ by a parametric distribution, for example Gaussian distributions, whose parameters are learned by an encoder neural network. The problem is to find a latent variable z, which maximizes the likelihood of generating an element $x_i$ of the training set.

It is desirable to reduce the need for labeled data in training of a classifier for indoor positioning.

SUMMARY

The present disclosure proposes a deep learning technique that requires only a small amount of the training data to be labeled to still generate a sufficiently accurate classifier for indoor positioning. The proposed deep learning technique is based on a variational autoencoder (VAE). The proposed deep learning technique allows obtaining reasonably accurate predictors at an annotation ratio of as low as 1-5% of the training dataset.

According to an embodiment, a computer-implemented method of training a predictor for the location of a computing device in an indoor environment is provided. The method includes receiving training data relating to the strength of signals from wireless access points received at positions of the indoor environment, where the training data includes a subset of labeled data, including signal strength values and location labels, and unlabeled data, including only signal strength values. The method further includes training a variational autoencoder to minimize a reconstruction loss of the signal strength values of the training data, where the variational autoencoder includes encoder neural networks, which encode the signal strength values in a latent variable, and decoder neural networks, which decodes the latent variable to reconstructed signal strength values for computing the reconstruction loss.

The method further includes training a classification neural network to minimize a prediction loss on the labeled data, where the classification neural network employs the latent variable to generate a predicted location. After training is completed, the encoder neural networks and the classification neural network form the predictor for the location of a computing device in the indoor environment.

According to another embodiment, a further computer-implemented method of training a predictor for locations of a computing device in an indoor environment is provided. The method includes receiving training data relating to the strength of signals from wireless access points received at positions of the indoor environment, where the training data includes a subset of labeled data, including signal strength values and location labels, and unlabeled data, including only signal strength values. The method includes training a classification neural network together with a variational autoencoder, where the classification neural network receives signal strength values of the training data as input and outputs a predicted location to decoder neural networks of the variational autoencoder. Training the classification neural network together with the variational autoencoder is based on minimizing a reconstruction loss and a prediction loss, the reconstruction loss being calculated between the signal strength values of the training data and reconstructed signal strength values, and the prediction loss being calculated between the predicted location and the location labels for the subset of labeled data of the training data. After training is completed, the classification neural network forms the predictor for the location of a computing device in the indoor environment.

According to an aspect, outputting the predicted location to the decoder neural networks of the variational autoencoder includes outputting the predicted location as a categorical latent variable to the decoder neural networks, where the variational autoencoder includes encoder neural networks which encode the signal strength values in a continuous latent variable, and where the decoder neural networks decode the categorical latent variable and the continuous latent variable to reconstructed signal strength values.

According to an aspect, minimizing the reconstruction loss and the prediction loss includes determining gradients of a sum of a first term and a second term with respect to first hidden states of the encoder neural networks, with respect to second hidden states of the decoder neural networks, and with respect to third hidden states of the classification neural network, where the first term measures the reconstruction loss for the training data, and the second term measures the prediction loss for the subset of labeled data of the training data.

According to another aspect, the encoder neural networks include an encoder neural network for the X coordinate, an encoder neural network for the Y coordinate, and an encoder neural network for the Z coordinate, and the decoder neural networks include corresponding decoder networks. Training the autoencoder may include training each encoder-decoder pair for a coordinate independent of the encoder-decoder pairs for the other coordinates.

According to an aspect, the outputs of the encoder neural network for the X coordinate, the encoder neural network for the Y coordinate, and the encoder neural network for the Z coordinate are concatenated to form the latent variable.

According to an embodiment, a predictor for locations of a computing device in an indoor environment is provided, the predictor being implemented by one or more computers. The predictor includes encoder neural networks, which encode the signal strength values in a latent variable. The predictor includes a classification neural network employing the latent variable to generate a predicted location of the computing device, where the encoder neural networks have been trained, together with corresponding decoder neural networks, as a variational autoencoder to minimize a reconstruction loss and the classification neural network has been trained to minimize a prediction loss.

According to another embodiment, a predictor for locations of a computing device in an indoor environment is provided, the predictor being implemented by one or more computers. The predictor includes a classification neural network, where the classification neural network generates a predicted location from signal strength values. The classification neural network has been trained together with a variational autoencoder, where during training the classification neural network outputs the predicted location to decoder neural networks of the variational autoencoder, where training the classification neural network together with the variational autoencoder is based on minimizing a reconstruction loss and a prediction loss.

According to an aspect, during training of the classification neural network together with the variational autoencoder, the predicted location is a categorical latent variable of the variational autoencoder.

According to an aspect, minimizing the reconstruction loss and the prediction loss includes determining gradients of a sum of a first term and a second term with respect to first hidden states of encoder neural networks of the variational autoencoder, with respect to second hidden states of the decoder neural networks and with respect to third hidden states of the classification neural network, where the first term measures the reconstruction loss, and the second term measures the prediction loss.

According to an aspect, the encoder neural networks include an encoder neural network for the X coordinate, an encoder neural network for the Y coordinate, and an encoder neural network for the Z coordinate, and the decoder neural network includes corresponding decoder networks, where each encoder-decoder pair for a coordinate is trained independent of the encoder-decoder pairs for the other coordinates.

According to another aspect, the prediction labels are multivariate data values indicating a location coordinate, and the prediction loss is a regression loss.

According to yet another aspect, the predictor may include a projection component configured to apply a weighted neighborhood projection to the absolute coordinate indicated by the multivariate data value of the prediction labels, where the weighted neighborhood projection employs a number of nearest neighbor nodes from the subset of labeled nodes. In embodiments, the number of nearest neighbor nodes may be 2.

According to another embodiment, a computer-readable storage medium is provided, the computer-readable storage medium having computer-executable instructions stored thereon, which, when executed by one or more processors perform a method for training a predictor for the location of a computing device in an indoor environment as described above. According to embodiments, the computer-executable instructions may provide a predictor for the location of a computing device in an indoor environment as described in accordance with embodiments described above.

In a feature, a computer-implemented method of training a predictor configured to predict a location of a computing device in an indoor environment is described. The method includes: receiving training data including strength of signals received from wireless access points at positions of an indoor environment, where the training data includes: a subset of labeled data including signal strength values and location labels; and a subset of unlabeled data including signal strength values and not including labels indicative of locations; training a variational autoencoder to minimize a reconstruction loss of the signal strength values of the training data, where the variational autoencoder includes: encoder neural networks configured to encode the signal strength values in a latent variable; and decoder neural networks configured to decode the latent variable to reconstructed signal strength values to determine the reconstruction loss; and training a classification neural network to minimize a prediction loss on the labeled data, where the classification neural network generated a predicted location based on the latent variable, and where the encoder neural networks and the classification neural network form the predictor configured to predict the location of the computing device in the indoor environment.

In a feature, a computer-implemented method of training a predictor configured to predicting a location of a computing device in an indoor environment is described. The method includes: receiving training data relating to a strength of signals received from wireless access points at positions in an indoor environment, where the training data includes: a subset of labeled data including signal strength values and location labels; and a subset of unlabeled data including signal strength values and not including labels indicative of locations; and training a classification neural network jointly with a variational autoencoder, where the classification neural network is configured to receive signal strength values of the training data as input and to output a predicted location to decoder neural networks of the variational autoencoder, where training the classification neural network together with the variational autoencoder includes minimizing a reconstruction loss and a prediction loss, the reconstruction loss being calculated between the signal strength values of the training data and reconstructed signal strength values, and the prediction loss being calculated between the predicted location and the location labels for the subset of labeled data of the training data, and where the classification neural network forms the predictor configured to predict the location of the computing device in the indoor environment.

In further features, the classification neural network is configured to output the predicted location to the decoder neural networks of the variational autoencoder as a categorical latent variable.

In further features, the variational autoencoder includes encoder neural networks configured to encode the signal strength values in a continuous latent variable.

In further features, the decoder neural networks decode the categorical latent variable and the continuous latent variable to reconstructed signal strength values.

In further features, minimizing the reconstruction loss and the prediction loss includes determining gradients of a sum of a first term and a second term with respect to first hidden states of the encoder neural networks, with respect to second hidden states of the decoder neural networks and with respect to third hidden states of the classification neural network.

In further features, the first term measures the reconstruction loss for the training data and the second term measures the prediction loss for the subset of labelled data.

In further features, the encoder neural networks include an encoder neural network for an X coordinate, an encoder neural network for a Y coordinate, and an encoder neural network for a Z coordinate.

In further features, the decoder neural networks include a decoder neural network for an X coordinate, a decoder neural network for a Y coordinate, and a decoder neural network for a Z coordinate.

In further features, training the variational autoencoder includes training the encoder and the decoder neural networks for the X coordinate independently of the encoder and the decoder neural networks for the y coordinate and independently of the encoder and the decoder neural networks for the Z coordinate.

In further features, training the variational autoencoder includes training the encoder and the decoder neural networks for the Y coordinate independently of the encoder and the decoder neural networks for the Z coordinate.

In further features, the output of the encoder neural network for the X coordinate, the output of the encoder neural network for the Y coordinate, and the output of the encoder neural network for the Z coordinate are concatenated to form the latent variable.

In a feature, a predictor is configured to predict a location of a computing device in an indoor environment, the predictor being implemented by one or more processors and code. The predictor includes: encoder neural networks configured to encode signal strength values in a latent variable; and a classification neural network configured to generate a predicted location for the location of the computing device based on the latent variable, where the encoder neural networks are trained jointly with decoder neural networks as a variational autoencoder to minimize a reconstruction loss and the classification neural network is trained to minimize a prediction loss.

In a feature, a predictor is configured to predict a location of a computing device in an indoor environment, the predictor being implemented by one or more processors and code. The predictor includes: a classification neural network configured to generate a predicted location from signal strength values, where the classification neural network is trained together with a variational autoencoder based on minimizing a reconstruction loss and a prediction loss, and where, during the training, the classification neural network outputs the predicted location to decoder neural networks of the variational autoencoder.

In further features, during the training of the classification neural network together with the variational autoencoder, the predicted location is a categorical latent variable of the variational autoencoder.

In further features, the classification neural network is trained together with a variational autoencoder based on minimizing the reconstruction loss and the prediction loss including determining gradients of a sum of a first term and a second term with respect to first hidden states of encoder neural networks of the variational autoencoder, with respect to second hidden states of the decoder neural networks, and with respect to third hidden states of the classification neural network.

In further features, the first term measures the reconstruction loss and the second term measures the prediction loss.

In further features: the encoder neural networks include an encoder neural network for a X coordinate, an encoder neural network for a Y coordinate, and an encoder neural network for a Z coordinate; and the decoder neural networks include a decoder neural network for the X coordinate, a decoder neural network for the Y coordinate, and a decoder neural network for the Z coordinate.

In further features: the encoder and the decoder neural networks for the X coordinate are trained independently of the encoder and the decoder neural networks for the y coordinate and independently of the encoder and the decoder neural networks for the Z coordinate; and the encoder and the decoder neural networks for the Y coordinate are trained independently of the encoder and the decoder neural networks for the Z coordinate.

In further features, the prediction labels are multivariate data values indicating a location coordinate and the prediction loss is a regression loss.

In further features, one or more processors are configured to apply a weighted neighborhood projection to an absolute coordinate indicated by the multivariate data value of the prediction labels, where the weighted neighborhood projection employs a number of nearest neighbor nodes from a subset of labelled nodes.

In further features, the number of nearest neighbor nodes is 2.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, where.

In the drawings, reference numbers may be reused to identify similar and/or identical elements.

DETAILED DESCRIPTION

A system for training a deep-learning system for Wi-Fi-based indoor localization with a semi-supervised training scheme that only requires a small fraction of labeled training data will be described in the following. For purposes of explanation, examples and specific details are set forth in order to provide a thorough understanding of the embodiments. Embodiments may include some or all of the features in these examples alone or in combination with the other features described below, and may further include modifications and the equivalence of the features and concepts described herein. The following description will refer to FIGS. 1 to 10, explaining example embodiments and example technical advantages in detail.

Figure 1:
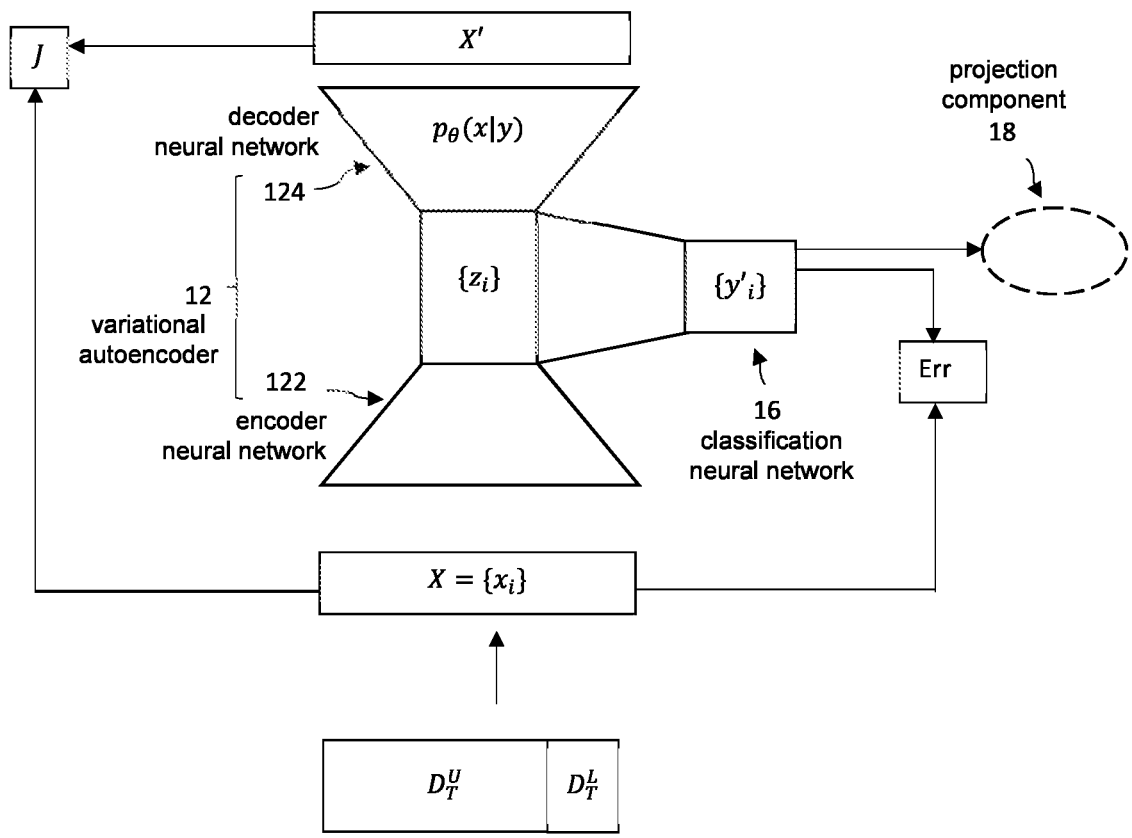
FIG. 1 is a schematic drawing relating to training a predictor for Wi-Fi-based indoor localization.
Figure 2:
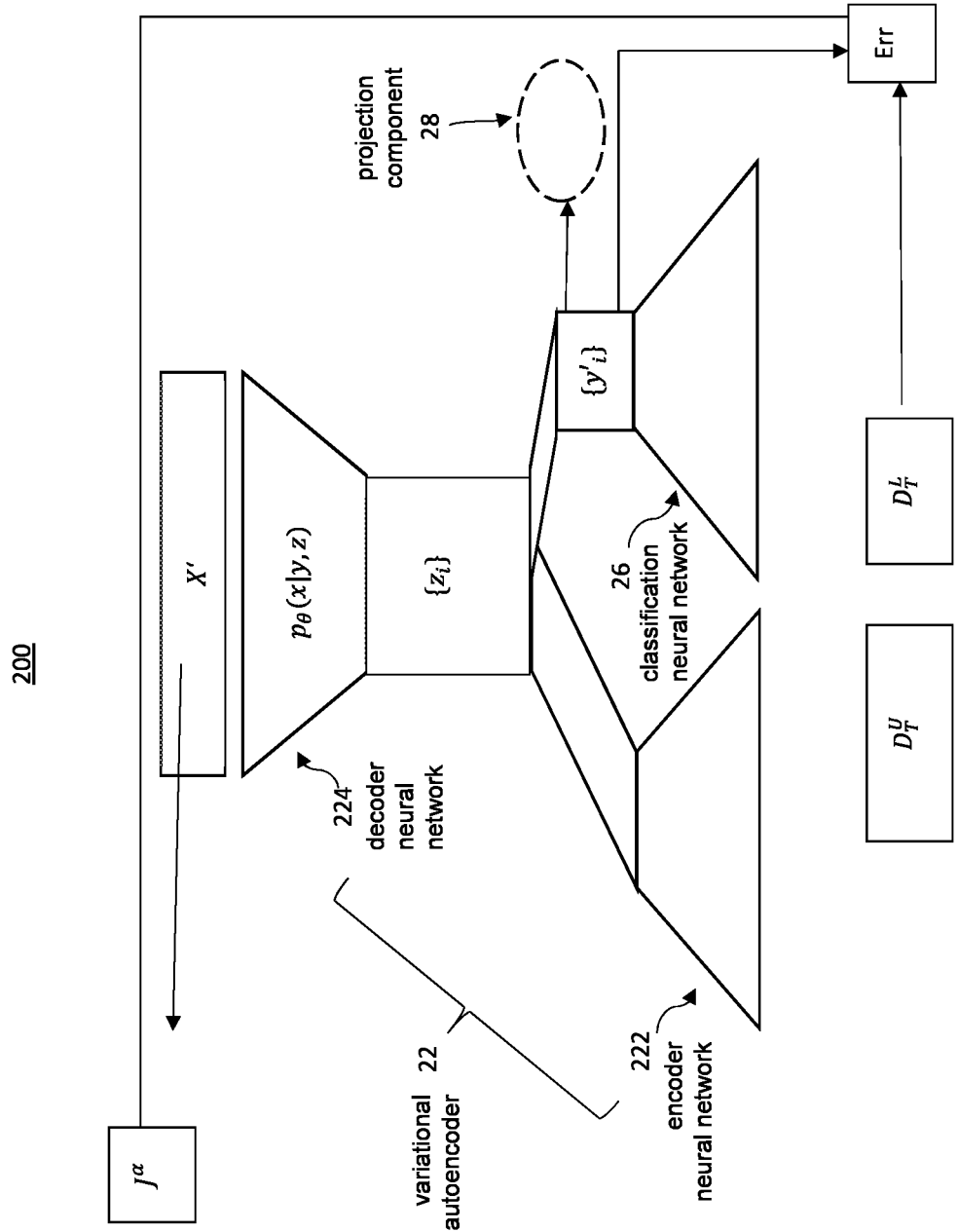
FIG. 2 is a schematic drawing relating to training a predictor for Wi-Fi-based indoor localization.

Training of the systems of FIG. 1 and FIG. 2 employs training data which includes a subset of labeled data $D_T^L = \{(x_i, y_i) | i=1, \ldots, n\}$. n is the number of labeled data, vector $x_i \in R^m$ are vectors of signal strength values, each received from one of the Wi-Fi access points $i=1, \ldots, m$. Variables $y_i$ are the annotation which can be categorical variables or multivariate variables indicating absolute coordinates.

In the former case of $y_i$ being categorical values, the problem solved by embodiments for training a predictor is a classification problem. In the latter case, the $y_i$ being multivariate data indicating absolute coordinates, embodiments relate to a regression setting.

The training data further includes unlabeled data values $D_T^U$, which include a collection of signal strength values $x_i$. In the following, the distribution of labeled data is represented by $p_l(x,y)$, and the distribution of the unlabeled data is represented by $p_u(x)$. The basic assumption, underlying the semi-supervised training method, is that $p_l(x,y)$ and $p_u(x)$ are samplings from a same distribution in x.

Example embodiments described herein, in particular, allow generating an accurate predictor even when $|D_T^L| \ll |D_T^U|$. The fraction $|D_T^L|/|D_T^U|$ is also referred to as the annotation ratio. The annotation ratio corresponds to the ratio of labeled to unlabeled data in the training data.

The training methods and systems described herein are based on variational autoencoders. Examples of variational autoencoders are described in Kingma et. al "*Semi-supervised Learning with Deep Generative Models*", arXiv: 1406.5298v2.

The present application is based on the concept of employing the training of a variational autoencoder, VAE, to train a classifier for indoor positioning, such as Wi-Fi based. The encoder of the VAE acts as a classifier or regressor of the labeled data, when labels are available, and the decoder of the VAE acts as a regularizer. The variational autoencoders simultaneously learn an encoding that embeds the encoded input signal strengths in a latent space and a location prediction. The encoding is learned from all of the training data, while the location prediction is learned from the labeled subset of the training data.

The trained VAE optimizes the latent space representation of the input data to allow their reconstruction, the classification task to be solved, involves determining the location giving rise to the input data, and can be trained with fewer labeled data points.

Figure 3:
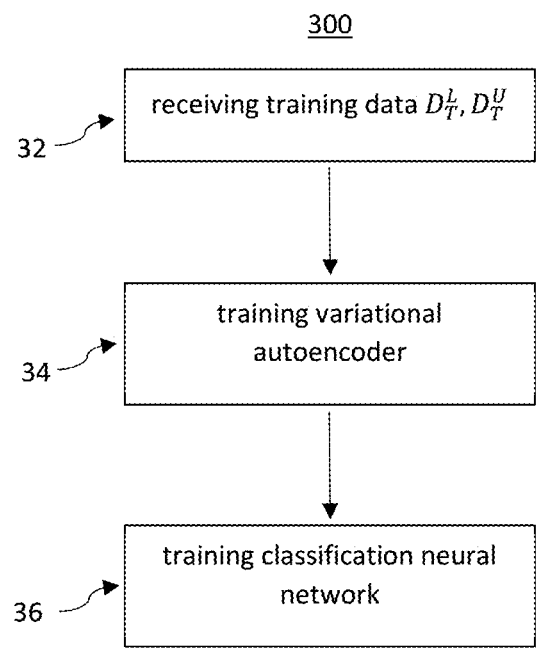
FIG. 3 is a flow diagram of a method of training a predictor for Wi-Fi-based indoor localization.

FIG. 1 involves a system 100 that trains a predictor of position of a computing device in an indoor environment. FIG. 3 shows a flow diagram of a method for training a predictor for position of a computing device in an indoor environment employing the system 100.

System 100 may be implemented by one or more computers, such as by one or more processors. System 100 includes variational autoencoder 12, which includes encoder neural network 122 and decoder neural network 124.

For training of the predictor (e.g., of the VAE), system 100 is provided with training data including $D_T^U$ and $D_T^L$.

$D_T^U$ is unlabeled points of the training data, and $D_T^L$ is labeled data points of the training data. The set of signal strength values $X=\{x_i\}$, which collects all signal strength data from $D_T^U$ and $D_T^L$, is provided to encoder neural network 122. Encoder neural network 122 encodes each $x_i \in X$ in a latent variable distribution in z. Encoder neural network 122 may determine parameters $\mu_\varphi(x_i)$, $\sigma_\varphi(x_i)$ of the distribution of the latent variable z. Decoder neural networks 124 employ samples $z_i$ from the latent variable distribution in z to produce reconstructed signal strength values $x'_i \in X'$.

System 100 further includes classification neural network 16 that employs the sample $z_i$ from the latent variable distribution to generate a location prediction $y'_i$. In embodiments, the labels $y_i$ of the training data can be a categorical variable indicative of locations, such as building numbers, room identifiers and/or floor levels, and the predicted location is a corresponding categorical value. Alternatively, the labels of the training data may be multivariate data indicating a 3D coordinate giving the latitude and longitude coordinates of a point together with the elevation, and the predicted location is a corresponding multivariate data value.

FIG. 1 illustrates a first example embodiment that includes a latent feature discriminative model. The first embodiment is based on the generative model according to $$p(z) = \mathcal{N}(z;0,I); \ p_\theta(x|y,z) = f(x;y,\theta) \quad (1)$$

where p(z) is a Gaussian distribution with mean 0 and identity matrix I as variance. Function $f(x;y,\theta)$ is a nonlinear likelihood function with generative parameter $\theta$. Function $f$ may be a Gaussian distribution whose probabilities are formed by decoder neural networks 124, whereby generative parameter $\theta$ corresponds to the hidden states of decoder neural networks 124.

Distribution p(z) is the prior distribution of the latent variable z. Because the exact posterior distribution may be intractable, variational autoencoder 12 may employ a parametric approximation for the posterior distribution. Variational autoencoder 12 is trained to minimize the difference between the parametric approximation and the exact posterior distribution, as explained below. According to the model applied for variational autoencoder 12, the posterior distribution of latent variable z is approximated as a parametric Gaussian distribution, $$q_\varphi(z|x) = \mathcal{N}(z|\mu_\varphi(x), \text{diag}(\sigma^2_\varphi(x))) \quad (2)$$

whose parameters $\mu_\varphi(x)$ and $\sigma^2_\varphi(x)$ are generated by encoder neural networks 122. Eq. (2) defines the latent variable distribution of latent variable z. Parameters $\varphi$ are variational parameters which correspond to hidden states of the encoder neural networks 122. Eq. (2) defines the inference model of the variational autoencoder.

Variational autoencoder 12 is trained by adjusting hidden states $\varphi$ and $\theta$ to minimize the loss $$J = \sum_{x \sim p_u(x)} E_{q_\varphi(z|x)}[KL[q_\varphi(z|x)\|p_\theta(z)] - \log p_\theta(z|x)] \quad (3)$$

where KL is the Kullback-Leibler divergence between the posterior distribution of latent variable z, $q_\varphi(z|x)$ and the prior distribution $p_\theta(z)$.

Under training, classification neural network 16 is configured to receive a sample $z_i$ from the latent variable distribution of latent variable z inferred/determined from the output of encoder neural network 122. The output of encoder neural network 122 encodes an $x_i \in D_T^L$.

Classification neural network 16 generates a predicted label $y'_i$ from the sample $z_i$. Classification neural network 16 may be trained to minimize a difference between predicted label $y'_i$ and label $y_i$. In this manner, the approximate posterior distribution $q_\varphi(z|x)$ as produced by encoder neural network 122 is used as a feature extractor for the labeled data $D_T^L$ to train classification neural network 16.

Accordingly, a method 300 for training a predictor according to FIG. 1 for the location of a computing device in an indoor environment includes receiving by one or more processors at 32 training data including labeled data $D_T^L$ and unlabeled data $D_T^U$. Receiving the training data may include obtaining the unlabeled data from crowd-sourcing or a by employing a browsing robot.

At 34, one or more processors train the autoencoder including encoder neural networks 122 and decoder neural networks 124, includes minimizing, for example, by stochastic gradient descent, the loss J calculated between signal strength values $x_i$ and reconstructed signal strength values $x'_i$. Minimizing the loss may include the one or more processors selectively adjusting one or more of generative parameters $\theta$ and variational parameters $\varphi$ to minimize the loss.

Method 300 further includes the one or more processors training classification neural network 16 at 36 to minimize a prediction error (Err) on the labeled data $D_T^L$. Because classification neural network 16 may employ the encoder representation of the input X according to the latent variable distribution of latent variable z, instead of the input X itself, classification neural network 16 may achieve a high accuracy even when $|D_T^L| \ll |D_T^U|$. This may be because separability of the data points is improved in the latent space of z.

After training of the system 100, classification neural network 16 can be employed together with encoder neural network 122 as a predictor for the location of an electronic device. Once trained, the classification neural network 16 and the encoder neural network 122 are configured to predict/determine the (present) location of the electronic device.

In an example, signal strength values $\tilde{x}_i$ are received by the electronic device, and therefrom provided to the predictor. Trained encoder neural network 122 of the predictor receives $\tilde{x}_i$ and generates parameters $\mu_\varphi(\tilde{x}_i)$ and $\sigma_\varphi(\tilde{x}_i)$ employing optimized hidden parameters $\varphi$. A sample $z_i$ is provided to trained classification neural network 16 which produces a prediction label $y'_i$ as output of the predictor.

Figure 4:
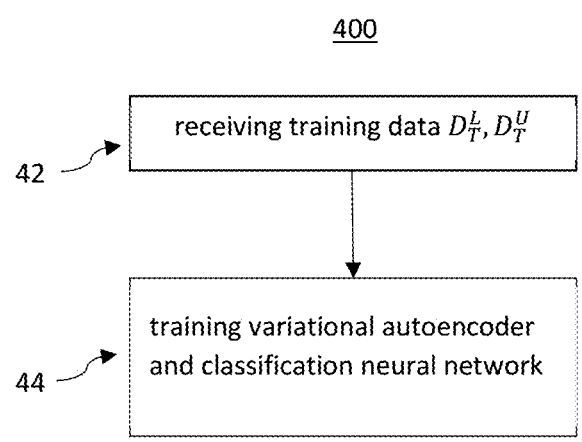
FIG. 4 is a flow diagram of a method of training a predictor for Wi-Fi-based indoor localization.

FIG. 2 shows a schematic drawing for a system 200 for training a predictor for indoor localization according to an example embodiment. FIG. 4 shows a flow diagram of a method for training a predictor for position of a computing device in an indoor environment employing the system of FIG. 2. Similar to the embodiment explained with reference to FIGS. 1 and 3, the system according to FIG. 2 employs training data $D_T$ which includes a subset of labeled data $D_T^L$ and a subset of unlabeled data $D_T^U$.

System 200 includes variational autoencoder 22 with encoder neural network 222 and decoder neural network 224. Encoder neural network 222 receives signal strength values $x_i$, and, together with classification neural network 26, determines parameters $\mu_\varphi$, $\sigma_\varphi$ of a latent variable distribution of latent variable z. From a sample $z_i$ of the latent variable distribution of latent variable z, decoder neural network 224 reconstructs $x_i'' \in X''$.

Classification neural network 26 receives signal strength values $x_i \in X$ of the training data as input and infers parameters of a latent variable distribution of latent variable y. A sample $y'_i$ is drawn from the latent variable distribution of latent variable y and is provided to decoder neural networks 224 of the variational autoencoder.

When training the system 200 of FIG. 2 employing for the unlabeled subset $D_T^U$, variable y is treated as a hidden variable of the variational autoencoder, whereas when training with $D_T^L$, variable y is an input variable.

According to the example of FIG. 2, training of the predictor is based on an autoencoder of a supervised generative model. Predictions are generated using a latent class variable y in addition to the latent continuous variable z. The generative model is $$p(z) = \mathcal{N}(z|0,I); p_\theta(x|y,z) = f(x;y,z,\theta), \qquad (5)$$

by which states x in the space of original input, i.e. wireless strength signals x are reconstructed from latent continuous variable z and latent class variable y. Parameters θ are hidden states of the generative model, and function $f$ is a nonlinear likelihood function. Function $f$ is implemented by decoder neural networks 224 having hidden states θ.

The prior distribution of labels y in the example of FIG. 2 is assumed as $$p(y) = \text{Cat}(y|\pi),$$

where Cat is the multinomial distribution with a vector of probabilities π whose elements sum up to 1. π is the set of classes which is known in advance and may be determined in dependence on the task. Accordingly, the labels y may be sampled from the set of classes π.

Similar to the example of FIG. 1, the example of FIG. 2 employs a parametric approximation to the exact posterior distribution. The parametric approximation in z is $$q_\varphi(z|y,x) = \mathcal{N}(z|\mu_\varphi(y,x), \text{diag}(\sigma_\varphi^2(x))). \qquad (6)$$

Eq. (6) defines the latent variable distribution of latent variable z, and defines the inference model of the autoencoder. According to the example of FIG. 2, parameter $\sigma_\varphi^2(x)$ is generated by encoder neural network 222, while parameter $\mu_\varphi(y,x)$ is jointly estimated by encoder neural network 222 and classification neural network 26.

Classification neural network 26 produces probabilities $\pi_\varphi(x)$ that are parameters of the latent variable distribution of latent variable y, according to $$q_\varphi(y|x) = \text{Cat}(y|\pi_\varphi(x)). \qquad (7)$$

Eq. (7) defines the latent variable distribution of latent variable y. Eq. (7) can be viewed as defining a discriminative classifier. For compactness of notation, the hidden states of classification neural network 26 are assumed as included in φ. Under the training as described below, the training according to the example of FIG. 2 allows obtaining an optimal classifier under the approximations used.

Accordingly, during training of the system according to the example of FIG. 2, $\mu_\varphi(y,x)$ of Eq. (6) is estimated from labeled data by classification neural network 26 and from unlabeled data by encoder neural network 222.

Training according to the embodiment of FIG. 2 includes evaluating $$J = \sum_{(x,y) \sim p_l(x,y)} L(x,y) + \sum_{x \sim p_u(x)} U(x), \qquad (8)$$

where the first term and the second term on the right-hand side arise from a lower bound for the likelihood that the autoencoder model reproduces the training data. The first term on the right-hand side of (Eq. 8) employs the distribution $p_l(x,y)$ of the labeled data to evaluate $$L(x,y) = E_{q_\varphi(z|x,y)}[-\log p_\theta(x|y,z) - \log p_\varphi(y) - \log p_\theta(z) + \log q_\varphi(z|x,y)], \qquad (9)$$

where $p_\theta(z)$ and $p_\theta(y)$ may correspond to parameter $p(z)$ from Eq. (5) and $p(y) = \text{Cat}(y|\pi)$, respectively, and depend on the parameters θ. Evaluation of Eq. 9 for the labeled data includes feeding the labeled data $D_T^L$ to autoencoder 22 and classification neural network 26, whereby variable y is treated as an input variable.

The second term on the right-hand side of Eq. (8) employs the distribution $p_u(x)$ of the unlabeled data $D_T^U$ to evaluate $$U(x) = E_{q_\varphi(y,z|x)}[-\log p_\theta(x|y,z) - \log p_\theta(y) - \log p_\theta(z) + \log q_\varphi(y,z|x)], \qquad (10)$$

where $q_\varphi(y,z|x)$ is a posterior distribution which may be learned during the training phase with the help of the deep learning network. It may start as a random one (e.g., value) and may converge to a final one (e.g., value) by being re-estimated during training. Evaluation of Eq. 10 for the unlabeled data includes feeding the unlabeled data $D_T^U$ to autoencoder 22 and classification neural network 26, whereby variable y is treated as a latent variable.

The encoder neural network 222, decoder neural network 224, and classification neural network 26 are trained to minimize loss $$J^\alpha = J + \alpha E_{p_l(x,y)} \text{Err}[q_\varphi(y|x)] \qquad (11),$$

where J is defined according to Eq. (8) and $\text{Err}[q_\varphi(y|x)]$ is a prediction loss on the labeled data. In Eq. (11), the value α is a predetermined value reflecting a trade-off between the contributions of the generative model and the contributions of the discriminative model in the learning process.

Training the predictor according to the example of FIG. 2 is based on minimizing a sum of a first term and a second term, the first term measuring a reconstruction loss for the training data, and the second term measuring a prediction loss for the labeled subset of the training data.

In an example, labels y are categorical values, for example, room numbers or another suitable identifier of a location. In this case the loss on the labeled data X is the classification loss $$E_{p_l(x,y)} \text{Err}[q_\varphi(y|x)] = E_{p_l(x,y)}[-\log q_\varphi(y|x)]$$

In an example, labels y are multi-varied data on the location coordinates such that labels y indicate location coordinates (e.g., latitude, longitude, and elevation). In this example, the classification loss of Eq. 9 is a regression loss described by $$E_{p_l(x,y)} \text{Err}[q_\varphi(y|x)] = E_{p_l(x,y)} |y - q_\varphi(y|x)|^2$$

FIG. 4 shows a method 400 performed by one or more processors for training a predictor according to the example of FIG. 2 for the location of a computing device in an indoor environment. At 42 training data is received including labeled data $D_T^L$ and labeled data $D_T^U$. The training data may have been obtained by augmenting a subset of labeled data with unlabeled data from crowd-sourcing or a by employing a browsing robot.

44 involves training the variational autoencoder 22 and the classification neural network 26. Training the variational autoencoder 22 and the classification neural network 26 includes repeatedly evaluating $J^\alpha$ by feeding autoencoder 22 with signal strength values $x_i$ from both $D_T^L$ and $D_T^U$, and feeding classification neural network 26 with signal strength values $x_i$ and labels from $D_T^L$ and adjusting generative parameters θ of decoder neural network 224 and variational parameters φ encoder neural network 222 and classification neural network 26 to minimize the loss, for example, using stochastic gradient descent.

After encoder neural network 222, decoder network 224, and classification neural network 26 have been trained, classification neural network 26 can be employed independent of encoder neural network 222 and decoder neural network 224. Classification neural network 26 can be provided with signal strength values $\tilde{x}_i$ received by a device in the indoor environment, and produces $\pi_\varphi(\tilde{x}_i)$ employing the values of the hidden states φ of classification neural network 26 that have resulted from the training as described above. From the distribution $q_\varphi(y|x)$, a predicted location y' can be generated as the prediction for the location of the device.

Embodiments optionally include methods of structural regression to constrain the restrictions to a feasible space. Some regression methods may ignore the structure of the output variables and therefore face the problem that predictions can fall outside the feasibility space. This may a priori limit the prediction space, i.e., in the present case, an indoor building space.

Predictions y' that indicate location coordinates, as generated by classification neural networks 16, 26, respectively, are provided to projection components 18, 28, respectively, that correct the prediction y to lie within the feasible space. The projection components 18, 28 may be implemented by one or more processors and code.

In embodiments, the correction is based on weighted nearest neighbor projection which considers the $N_r$ neighbors from the labeled subset $D_T^L$ of the training data that are nearest to the location predicted by the encoder. The projection is given by the weighted sum of the locations of the $N_r$ nearest neighbor nodes weighted by an inverse of the distances between the predicted location and the corresponding neighbor. This projection corresponds to a projection in the convex hull of the $N_r$ nearest neighbor nodes, and works well when the closest neighbors are topologically close to each other instead of, e.g., belonging to different buildings. If the neighboring nodes are distant, for example, located in different buildings, the structured projection may increase the error. The risk of this error can be minimized by choosing rather small values of $N_r$. According to experimental results, $N_r=2$ may provide suitably (e.g., most) accurate results.

Figure 5B:
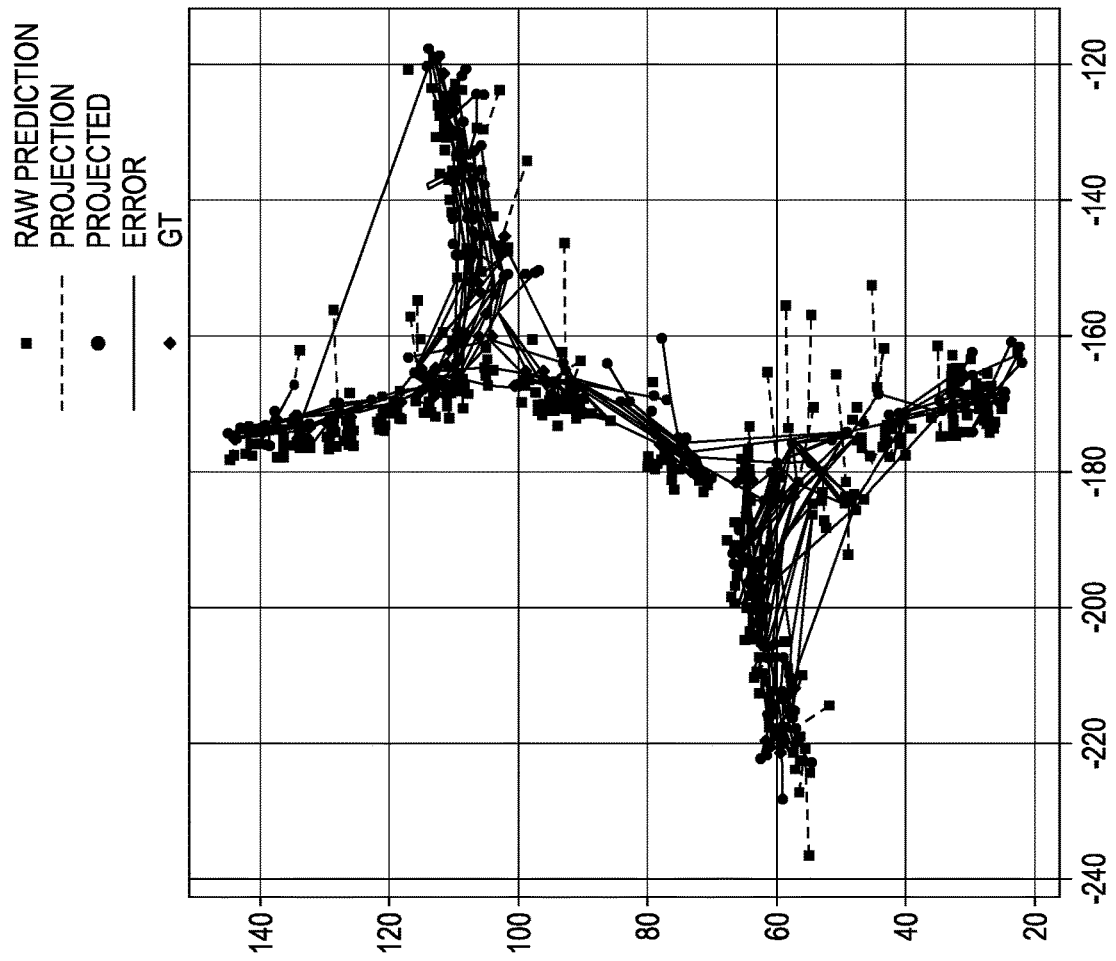
FIG. 5 illustrates a method of structured regression implemented in embodiments of a predictor for Wi-Fi-based indoor localization.
Figure 5A:
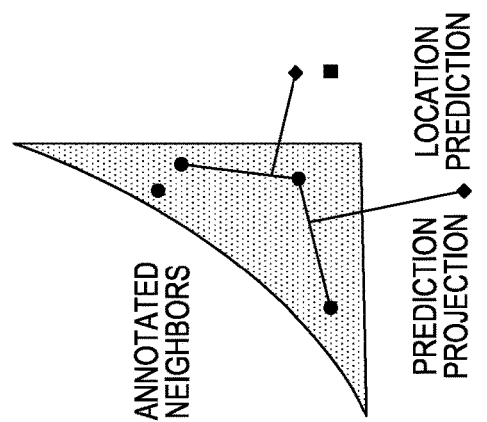

FIG. 5 shows an example of the structured projection applied to the raw predictions generated according to an example. Location predictions of the classification neural networks 16, 26 (indicated as "raw prediction" in the legend) are projected to an interpolation between $N_r=2$ closest labeled neighbors to obtain a projected location (indicated as "projected"). FIG. 5 compares the projected location with the ground truth (indicated as "GT") location. The illustration of FIG. 5 shows that the projection improves localization error in all but a few cases.

According to embodiments, encoder neural networks 122, 222, decoder neural networks 124, 224, and classification neural networks 16, 26 are all implemented as artificial neural networks with three fully connected layers with ReLU (rectified linear unit) activation, and having layer sizes of 512, 256, and z=128. In examples, the classification/regression loss in Eq. (11) is weighted with α=1. In examples, the network is trained using stochastic gradient descent, for example by employing an Adam optimizer with a learning rate of 0.01, batch size of 64 with batch normalizations, and stopping criterion of the learning at 20,000 iterations. Dropout with probability of 0.5 is applied in all layers of the neural networks. The localization error on the test set is used as the evaluation metric.

According to an example, encoder neural networks 122, 222 include separate encoder neural networks for X, Y, and Z coordinates and the decoder neural networks 124, 224 include corresponding decoders for X, Y and Z. The latent variable z may include a concatenation of encoder outputs of the three encoders. Training of the predictor according to FIGS. 1 and 3, or FIGS. 2 and 4 may include training each encoder-decoder pairs of the X, Y and Z coordinates independent of the other encoder-decoder pairs. This embodiment thereby allows to decorrelate the processing of the different coordinates.

In other examples, encoder neural networks 122, 222 include separate encoder neural networks for X and Y, and the decoder neural networks 124, 224 correspondingly include decoders for X and Y. In this embodiment, training of the predictor according to FIGS. 1 and 3, or FIGS. 2 and 4 may include training the encoder-decoder pair for X independent of the encoder-decoder pair for Y. Latent variable z may in this example include a concatenation of encoder outputs of the two encoders.

Training according to the examples of FIGS. 1 and 2 may further include training a building classifier (a classifier configured to generate locations within a building) with training data that also include a building label. Classification neural networks are trained for specific buildings. Based on the classification predicted by building classifier, one or more processors select a classification neural network specifically trained for this building. This allows obtaining classification neural networks that are more precise in the location prediction for a specific building.

Experimental Evaluation

FIG. 6 shows the setting of tests performed to evaluate the predictor of indoor locations trained according to the embodiments described above. FIGS. 6A-6C involve the UJI-IndoorLoc data set that covers a surface of 108,703 square meters (m²) in three buildings of the Universitat Jaume I, Campus Castellõ, Spain.

Figure 6A:
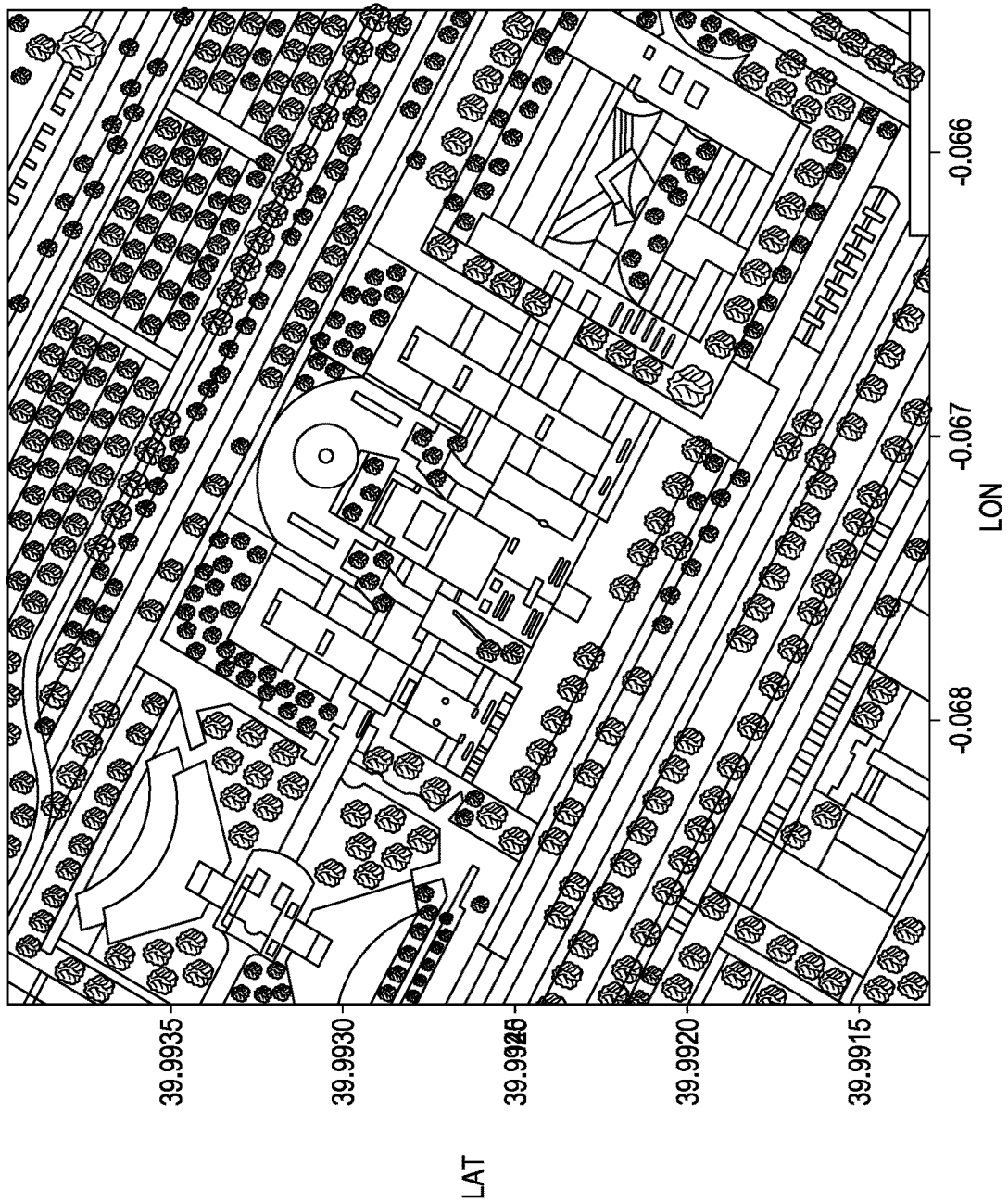
FIG. 6A is an aerial image of the buildings employed for a test of the predictor for Wi-Fi-based indoor localization.
Figure 6B:
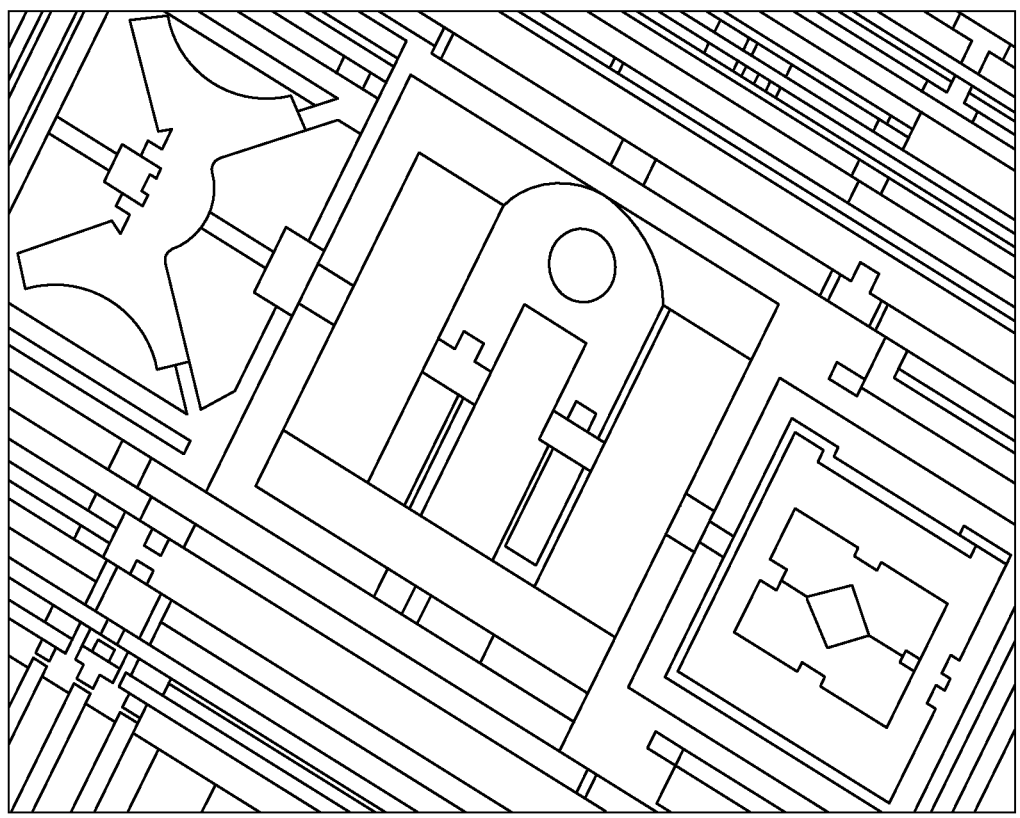
FIG. 6B highlights the buildings in the aerial image.
Figure 6C:
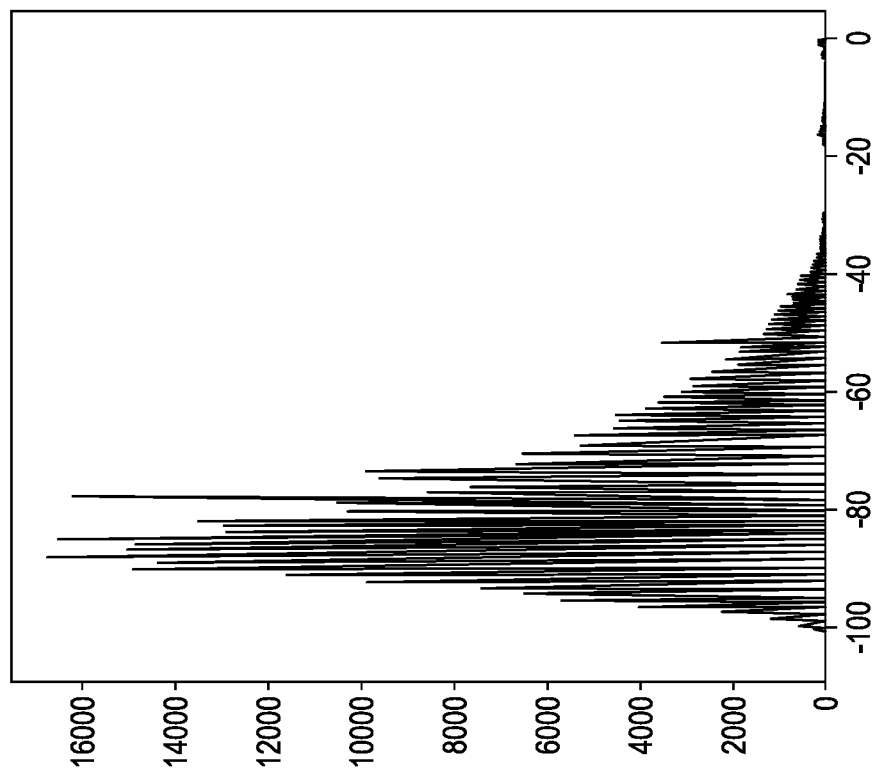
FIG. 6C shows a distribution of Wi-Fi access points in the buildings.
Figure 6C:
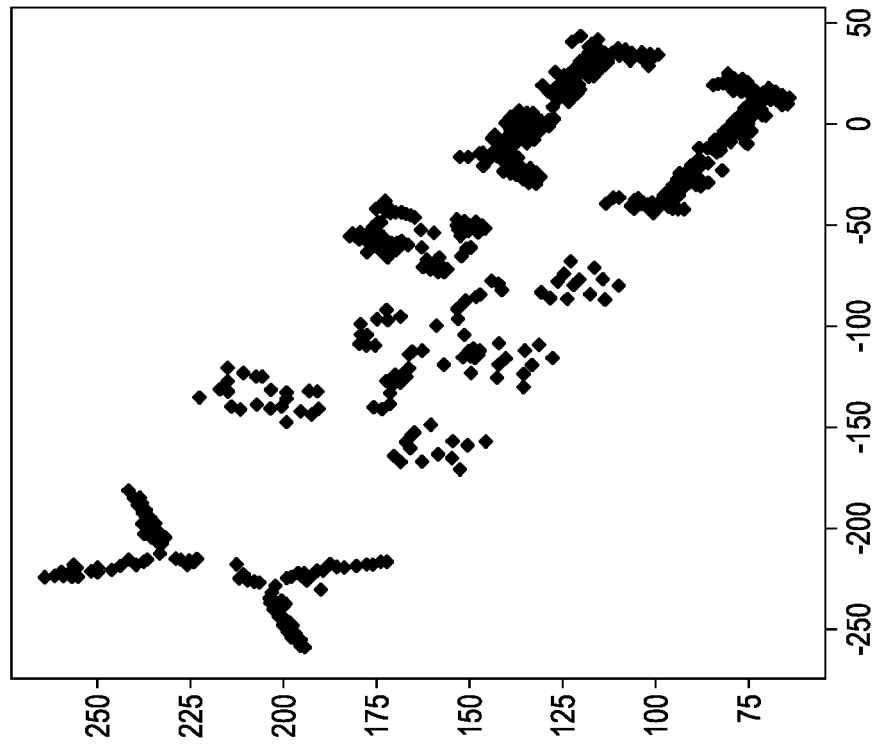

FIG. 6A reproduces an aerial view of the three buildings, and FIG. 6B highlights the area of the three buildings. The left panel of FIG. 6C shows how 933 access points are distributed over the three UJI campus buildings. The right panel of FIG. 6C plots a histogram of received signal strength values in the data set. In total, the data set includes 21,049 sample points, of which 19,938 points are used for training and 1,111 are used for testing. Testing samples were taken 4 months after the training samples to ensure dataset independence. Data was collected by 20 users with 25 different mobile device models.

Figure 7A:
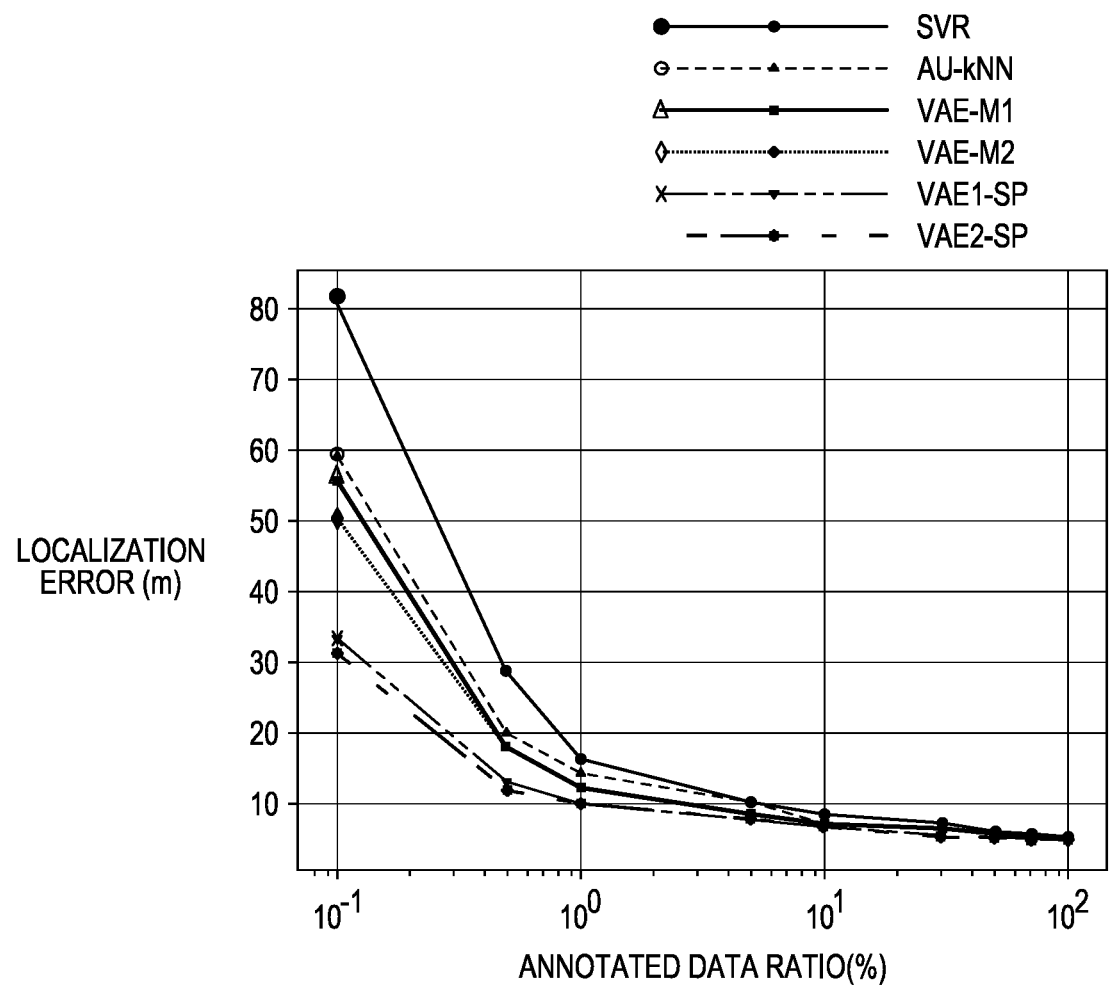
FIG. 7A shows plots of a location error in dependence on the annotation ratio for indoor Wi-Fi localization methods.
Figure 7B:
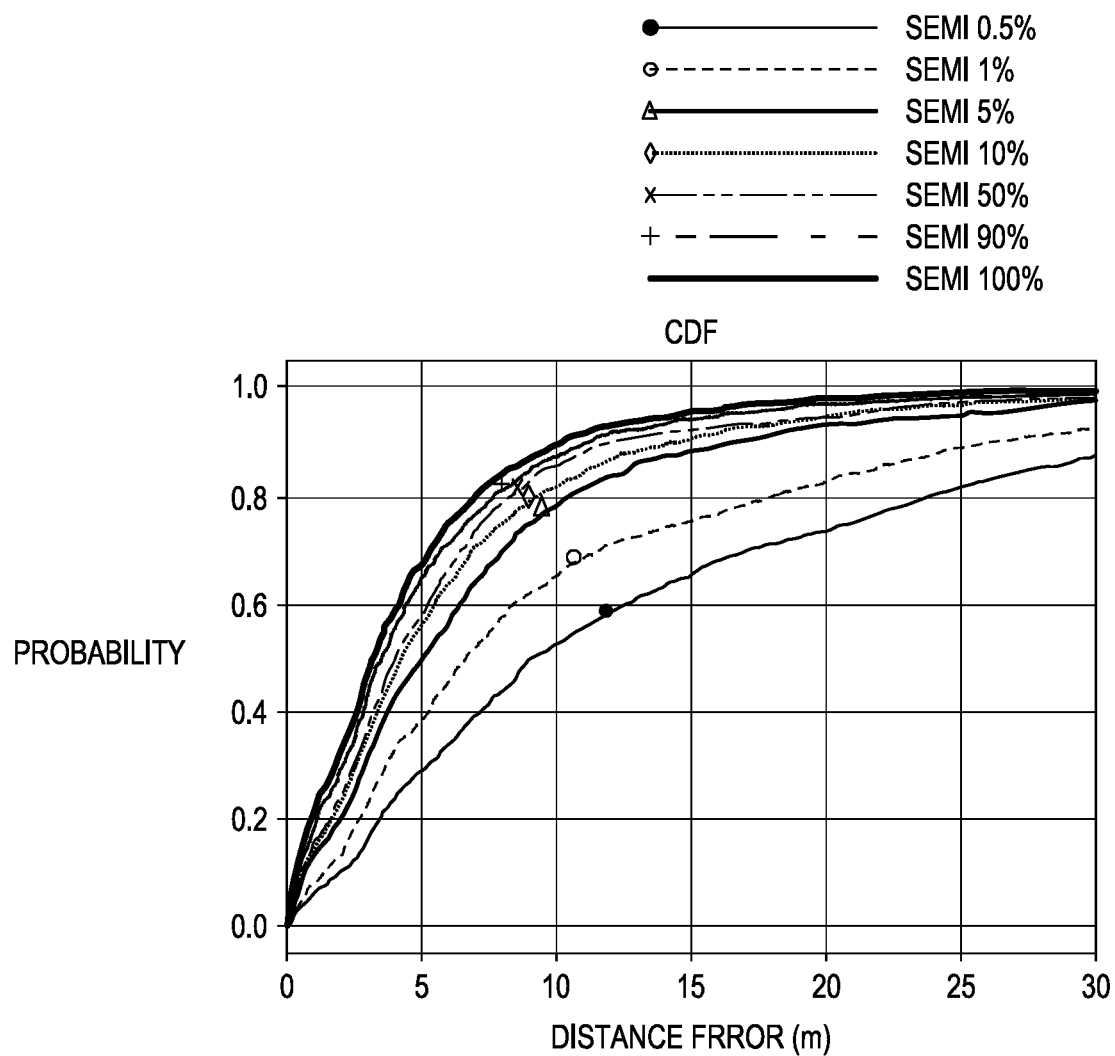
FIG. 7B shows cumulative density functions of a location error for a predictor trained according to an embodiment with various annotation ratios.

FIG. 7 shows results on the localization error of the systems described herein for the indoor environment described with reference to FIG. 6. The localization error is the Euclidean distance between the predicted and the actual coordinates of the test point. The mean of the localization errors over the test set is reported as the performance of a method in FIGS. 7A-7C. FIG. 7A compares examples of indoor localization systems described herein with other indoor localization systems, where FIG. 7A plots the localization error of each method in dependence on the annotation ratio in the training set of semi-supervised training.

An example other method of indoor localization is semi-supervised support vector regression (SVR) that employs hyper-parameters C and y. Another example of another method is k-nearest neighbor regression (kNN), employing the hyper-parameter k. The optimal hyper-parameters were determined by a five-fold inner cross-validation searching C ∈ {1, 10, 10², 10³} for SVR, and k ∈ {1, 2, 3, 5, 10} for kNN. The kNN method may be combined with a de-noising autoencoder (AU) applied to the signal strength values.

FIG. 7A further shows results of the localization error of the variational autoencoders proposed herein, where VAE-M1 refers to the first example of FIG. 1, VAE-M2 refers to the second example of FIG. 2, and VAE1-SP, VAE2-SP refer to the first and second examples of the variational autoencoder, respectively, improved by the structured projection as explained above with reference to FIG. 5. As shown in FIG. 7A, all methods achieve a mean localization error of approximately 5 m in the fully supervised setting when the annotation data ratio is 100. The localization error employing the train/test split of the UJI indoor log data set for the methods tested is given in Table 1. The method VAE2-SP may achieve the lowest mean localization error among the methods tested.

TABLE 1

| | | | Method | | | |
|---|---|---|---|---|---|---|
| SVR | KNN | AU-KNN | VAE-M1 | VAE-M2 | VAE1-SP | VAE2-SP |
| RMSE (m) 5.41 | 5.98 | 5.47 | 5.32 | 5.21 | 4.73 | 4.65 |

As shown in FIG. 7A, when only 10% of the data is labeled, the methods other than those described in the present application result in a localization error of at least 60 m (meters), while the variational autoencoder of the first and second examples achieve a lower localization error. When the variational autoencoders are enhanced by the structured projection of FIG. 5, localization error is approximately half of the other examples.

The results displayed in FIG. 7A illustrate that all methods resist a modest annotation reduction reasonably well when 50% or more data are labeled. However, when a reduction becomes significant and considerably reduces the expensive collection of labeled data, the VAE-based methods discussed herein resist better than the other methods and still achieve a reasonable prediction accuracy.

FIG. 7B shows the effect of reducing the fraction of labeled data in data. FIG. 7B displays the cumulative distribution function of the localization error for the predictor based on the VAE2-SP training. As shown in FIG. 7B, this predictor resist well to reduction of the annotation ratio to as low as 1-5%.

Figure 8:
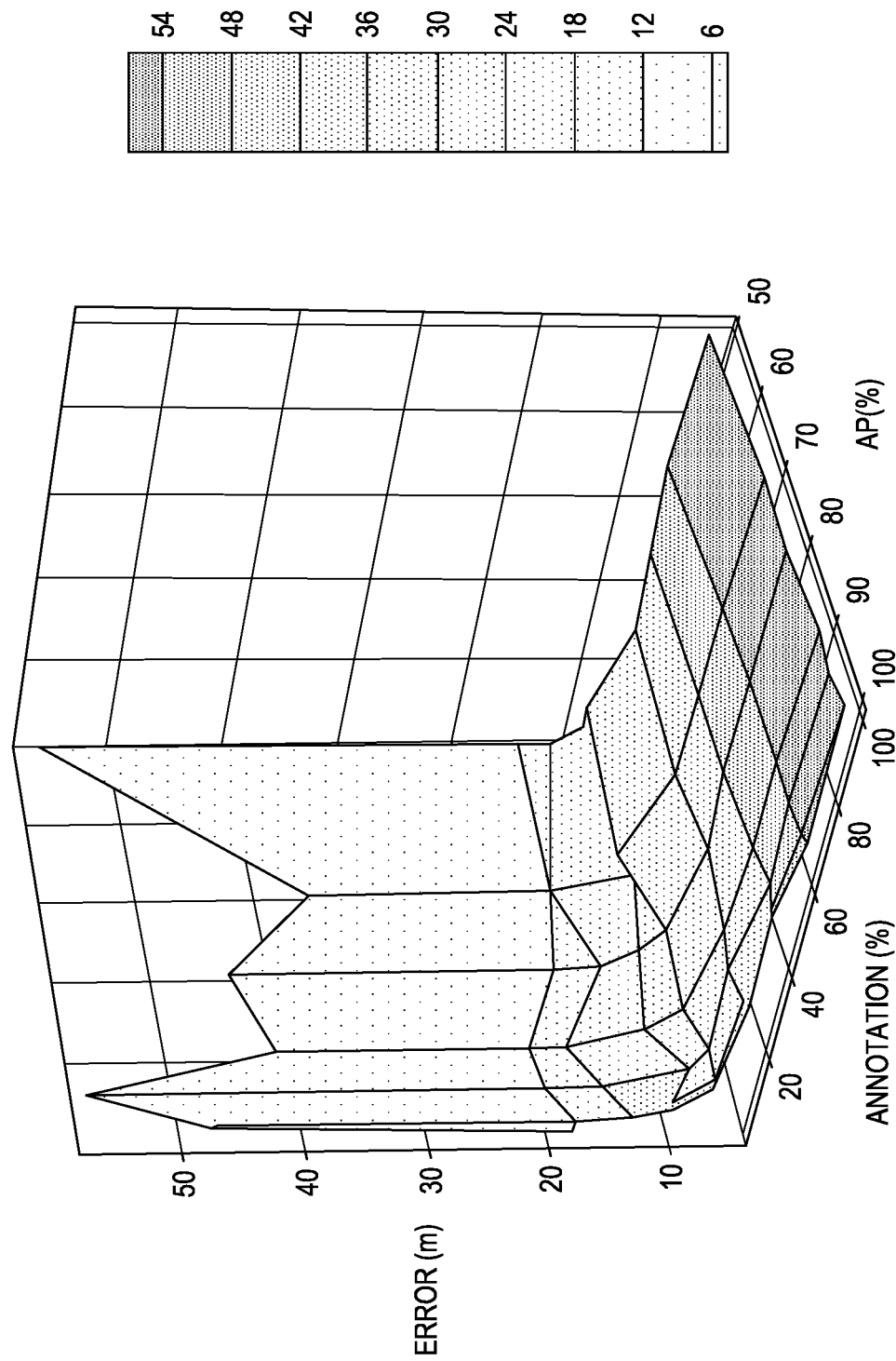
FIG. 8 shows the localization error of predictors according to embodiments in dependence on the annotation ratio and on the availability of access points at test time.

FIG. 8 relates to a further problem of indoor localization in real life settings where some of the Wi-Fi access points stop emitting their signals due to, for example, technical or business related issues. FIG. 8 plots the localization error in dependence on both the annotation fraction and the ratio of available Wi-Fi access points. The ratio of available Wi-Fi access points varies from 100%, when all Wi-Fi access points are available at test time, to 50%, when only half the Wi-Fi access points are available at test time. The results presented in FIG. 5 are obtained by retraining the model in the function of available Wi-Fi access points.

The results of FIG. 8 relate to the example including the VAE2-SP model. In the case of available access points being 50%, the localization error is 5.12 m for fully labeled data and 6.43 m for an annotation fraction of 5%, which is an error comparable with the error measured when 100% of the access points are available, which are 5.65 m for fully labeled data and 6.12 m for an annotation fraction of 5%.

Figure 9A:
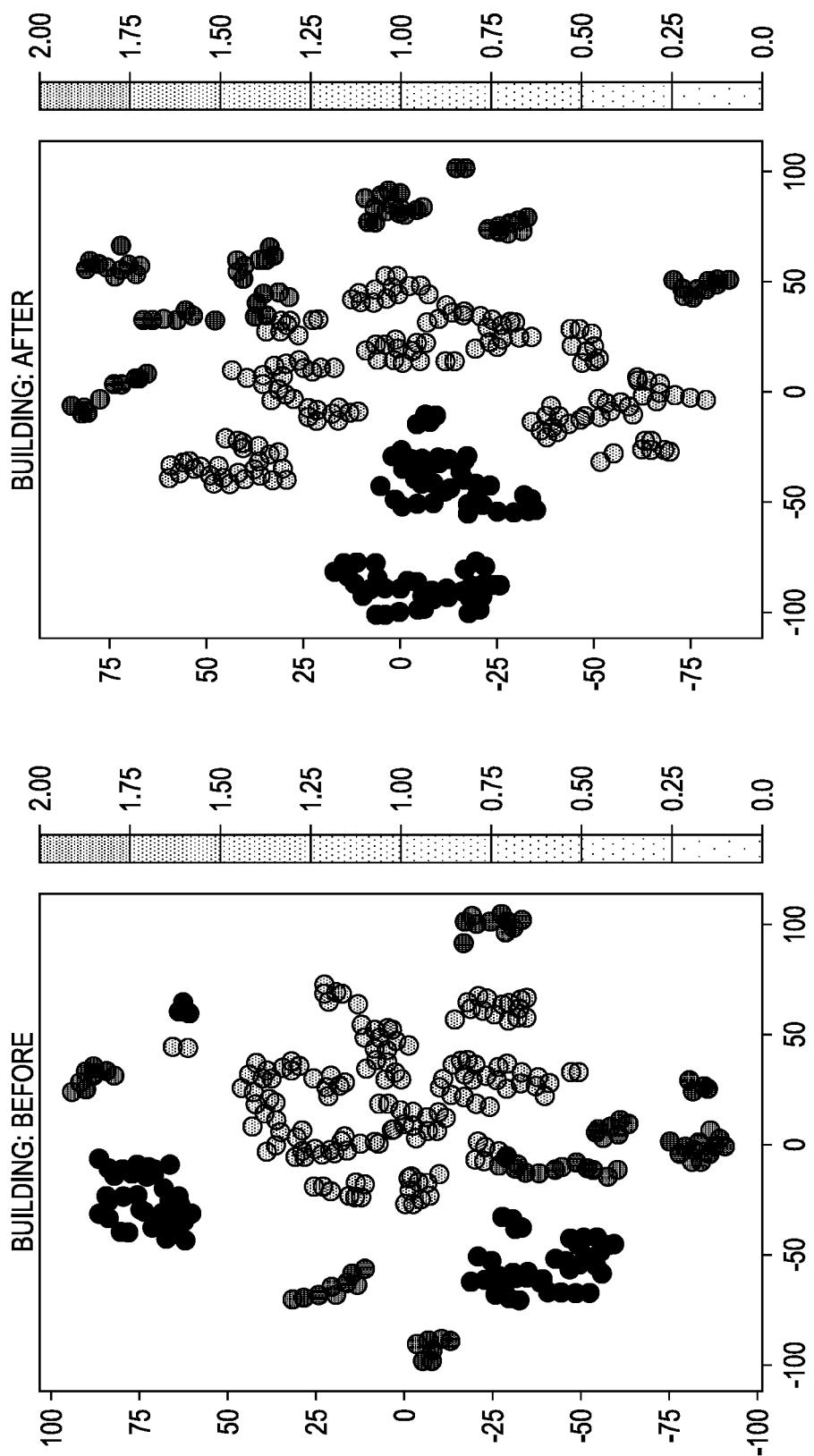
FIGS. 9A-9B show a t-distributed stochastic neighbor embedding of the reconstruction of the Wi-Fi signals by a variational autoencoder.
Figure 9B:
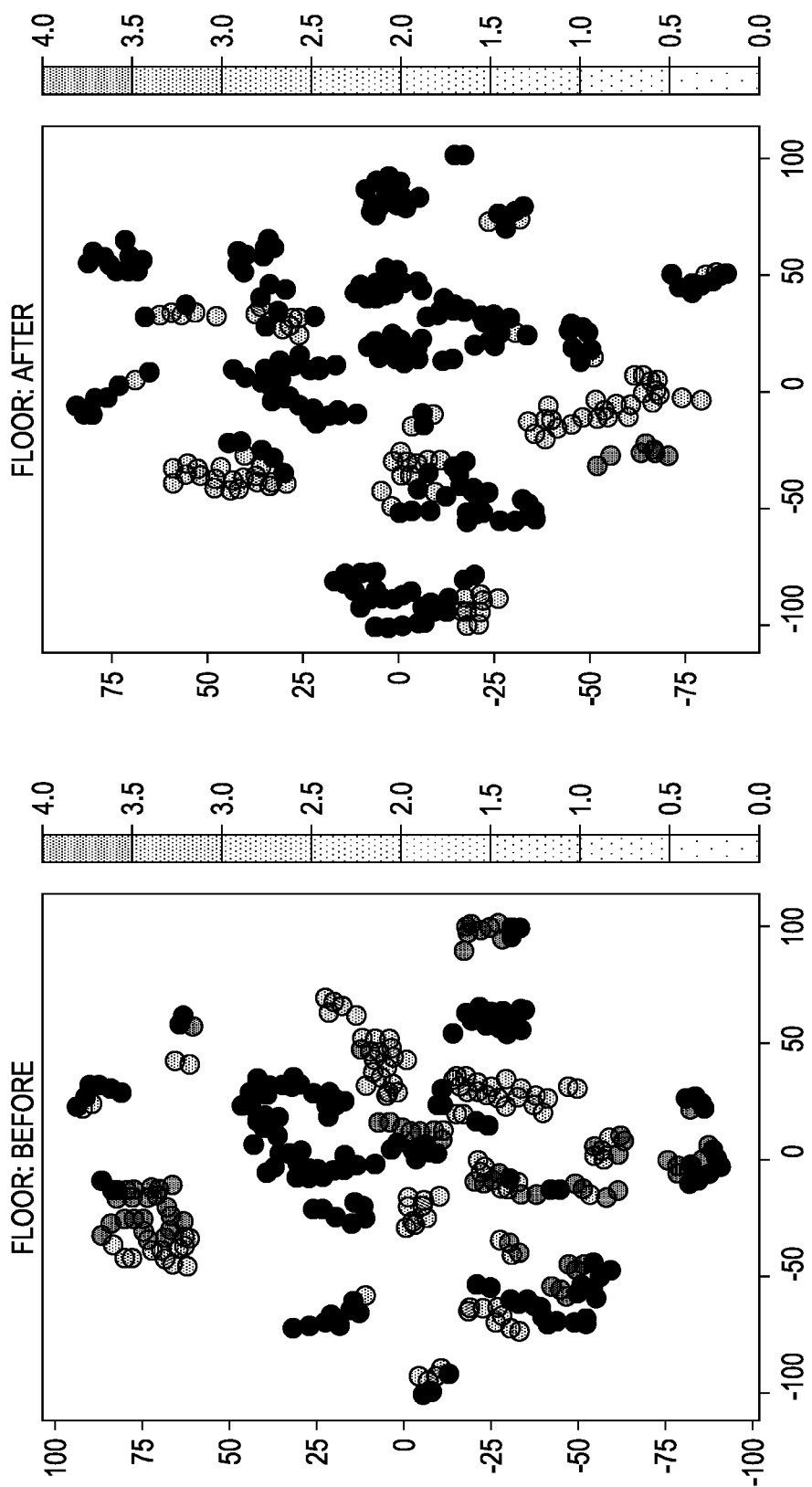

FIGS. 9A-9B show a visualization of the VAE in the form of a t-distributed stochastic neighbor embedding (t-SNE) shown before VAE, i.e., applied to the input signal strength data X, in the left panel and after VAE, i.e., applied to the reconstructed signal strength data X', or X", respectively, in the right panel. The data points are gray according to the label produced by the classification neural network, a building attribute in FIG. 9A, or a floor attribute, in FIG. 9B. The results of FIG. 9A-9B imply that data produced by the VAE have a better separability than the original data, which explains the high accuracy of the predictor under training with low annotation ratio.

Figure 10:
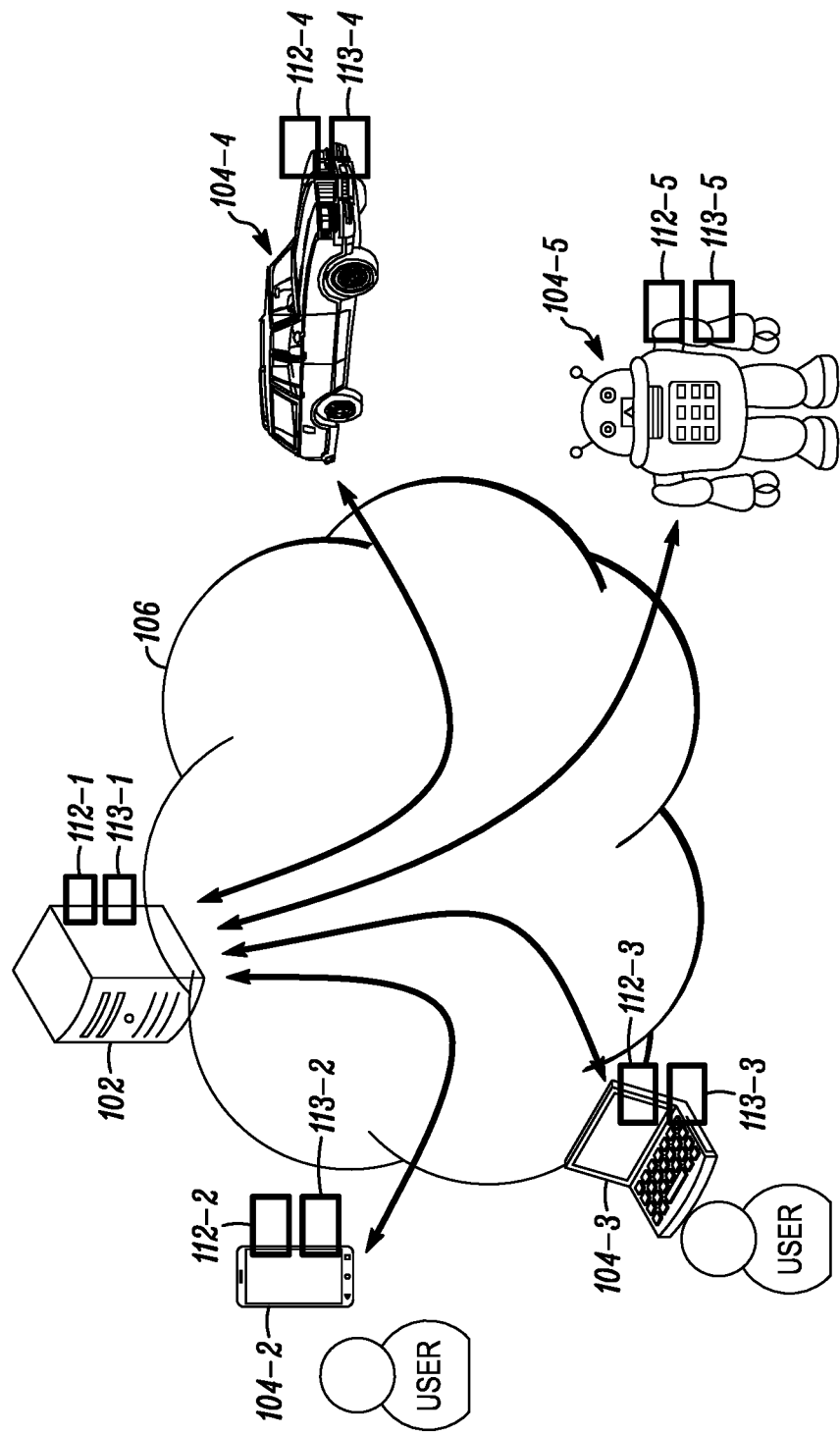
FIG. 10 illustrates an example architecture in which the disclosed methods may be performed.

The above-mentioned systems, methods and embodiments may be implemented within an architecture such as illustrated in FIG. 10, which includes server 102 and one or more client devices 104 that communicate over a network 106 (which may be wireless and/or wired) such as the Internet for data exchange. Server 102 and the client devices 104 each include a data processor (or more simply processor) 112 (112-1 through 112-5) and memory 113 (113-1 through 113-5), such as a hard disk. The client devices 104 may be any devices that communicate with server 102, including cellular phones 104-2, computer 104-3, autonomous vehicle 104-4, or robot 104-5. More precisely in an embodiment, the system according to the embodiments of FIGS. 1 and 2 may be implemented by server 102. The client devices 104 are configured to communicate using one or more Wi-Fi (IEEE 802.11) protocols.

Server 102 may receive training data and train a predictor according to the embodiments of FIGS. 1 and 3, or FIGS. 2 and 4, and store the predictor in memory 113-1. For example, once the predictor has been trained and stored in client device 104, client device 104, located in an indoor environment, determines signal strength values received from wireless access points and provides the determined signal strength values over network 106 to server 102, which applies the trained predictor to the signal strength values to determine a predicted location of the client device 104, and may provide the predicted location to client device 104 over network 106. Alternatively, the predictor may be downloaded for offline use to the client devices 104.

Some or all of the method steps described above may be implemented by a computer in that they are executed by (or using) a processor, a microprocessor, an electronic circuit or processing circuitry.

The embodiments described above may be implemented in hardware or in software. The implementation can be performed using a non-transitory storage medium such as a computer-readable storage medium, for example a floppy disc, a DVD, a Blu-Ray, a CD, a read only memory (ROM), a PROM, and EPROM, an EEPROM, a random access memory (RAM), or a FLASH memory. Such computer-readable media can be any available media that can be accessed by a general-purpose or special-purpose computer system.

Generally, embodiments can be implemented as a computer program product with a program code or computer-executable instructions, the program code or computer-executable instructions being operative for performing one of the methods when the computer program product runs on a computer. The program code or the computer-executable instructions may, for example, be stored on a computer-readable storage medium.

In an embodiment, a storage medium (or a data carrier, or a computer-readable medium) includes, stored thereon, the computer program or the computer-executable instructions for performing one of the methods described herein when it is performed by one or more processors.

Thus, the methods and systems disclosed herewith allow accurate indoor localization with reduced need for labeled data points for training, thereby reducing expense for training of the system data. Embodiments described are based on the realization that the latent space of variational autoencoders allows training of a classifier to high accuracy at low annotation ratios.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

The term code may include software, firmware, and/or microcode, and may refer to programs, routines, functions, classes, data structures, and/or objects. The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory (such as a flash memory, an erasable programmable read-only memory, or a mask read-only memory), volatile memory (such as a static random access memory or a dynamic random access memory), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computer-implemented method of training a predictor configured to predict a location of a computing device in an indoor environment, the method comprising:
  receiving training data including strength of signals received from wireless access points at positions of an indoor environment,
  wherein the training data includes:
    a subset of labeled data including signal strength values and location labels; and
    a subset of unlabeled data including signal strength values and not including labels indicative of locations;
  training a variational autoencoder to minimize a reconstruction loss of the signal strength values of the training data,
  wherein the variational autoencoder includes:
    encoder neural networks configured to encode the signal strength values in a latent variable; and
    decoder neural networks configured to decode the latent variable to reconstructed signal strength values to determine the reconstruction loss; and
  training a classification neural network to minimize a prediction loss on the labeled data, wherein the classification neural network generates a predicted location based on the latent variable, and wherein the encoder neural networks and the classification neural network form the predictor configured to predict the location of the computing device in the indoor environment.

2. A computer-implemented method of training a predictor configured to predict a location of a computing device in an indoor environment, the method comprising:

receiving training data relating to a strength of signals received from wireless access points at positions in an indoor environment, wherein the training data includes:
a subset of labeled data including signal strength values and location labels; and
a subset of unlabeled data including signal strength values and not including labels indicative of locations; and training a classification neural network jointly with a variational autoencoder, wherein the classification neural network is configured to receive signal strength values of the training data as input and to output a predicted location to decoder neural networks of the variational autoencoder, wherein training the classification neural network together with the variational autoencoder includes minimizing a reconstruction loss and a prediction loss, the reconstruction loss being calculated between the signal strength values of the training data and reconstructed signal strength values, and the prediction loss being calculated between the predicted location and the location labels for the subset of labeled data of the training data, and wherein the classification neural network forms the predictor configured to predict the location of the computing device in the indoor environment.

3. The method of claim 2, wherein the classification neural network is configured to output the predicted location to the decoder neural networks of the variational autoencoder as a categorical latent variable.

4. The method of claim 3 wherein the variational autoencoder includes encoder neural networks configured to encode the signal strength values in a continuous latent variable.

5. The method of claim 4 wherein the decoder neural networks decode the categorical latent variable and the continuous latent variable to reconstructed signal strength values.

6. The method of claim 3, wherein minimizing the reconstruction loss and the prediction loss includes determining gradients of a sum of a first term and a second term with respect to first hidden states of the encoder neural networks, with respect to second hidden states of the decoder neural networks and with respect to third hidden states of the classification neural network.

7. The method of claim 6 wherein the first term measures the reconstruction loss for the training data and the second term measures the prediction loss for the subset of labelled data.

8. The method of claim 3, wherein the encoder neural networks include an encoder neural network for an X coordinate, an encoder neural network for a Y coordinate, and an encoder neural network for a Z coordinate.

9. The method of claim 8 wherein the decoder neural networks include a decoder neural network for an X coordinate, a decoder neural network for a Y coordinate, and a decoder neural network for a Z coordinate.

10. The method of claim 9 wherein training the variational autoencoder includes training the encoder and the decoder neural networks for the X coordinate independently of the encoder and the decoder neural networks for the y coordinate and independently of the encoder and the decoder neural networks for the Z coordinate.

11. The method of claim 10 wherein training the variational autoencoder includes training the encoder and the decoder neural networks for the Y coordinate independently of the encoder and the decoder neural networks for the Z coordinate.

12. The method of claim 9, wherein the output of the encoder neural network for the X coordinate, the output of the encoder neural network for the Y coordinate, and the output of the encoder neural network for the Z coordinate are concatenated to form the latent variable.

13. A predictor configured to predict a location of a computing device in an indoor environment, the predictor being implemented by one or more processors and code, the predictor comprising:

encoder neural networks configured to encode signal strength values in a latent variable; and a classification neural network configured to generate a predicted location for the location of the computing device based on the latent variable, wherein the encoder neural networks are trained jointly with decoder neural networks as a variational autoencoder to minimize a reconstruction loss and the classification neural network is trained to minimize a prediction loss.

14. A predictor configured to predict a location of a computing device in an indoor environment, the predictor being implemented by one or more processors and code, the predictor comprising:

a classification neural network configured to generate a predicted location from signal strength values, wherein the classification neural network is trained together with a variational autoencoder based on minimizing a reconstruction loss and a prediction loss, and wherein, during the training, the classification neural network outputs the predicted location to decoder neural networks of the variational autoencoder.

15. The predictor of claim 14, wherein, during the training of the classification neural network together with the variational autoencoder, the predicted location is a categorical latent variable of the variational autoencoder.

16. The predictor of claim 14, wherein the classification neural network is trained together with a variational autoencoder based on minimizing the reconstruction loss and the prediction loss including determining gradients of a sum of a first term and a second term with respect to first hidden states of encoder neural networks of the variational autoencoder, with respect to second hidden states of the decoder neural networks, and with respect to third hidden states of the classification neural network.

17. The predictor of claim 16 wherein the first term measures the reconstruction loss and the second term measures the prediction loss.

18. The predictor of claim 17, wherein:
the encoder neural networks include an encoder neural network for a X coordinate, an encoder neural network for a Y coordinate, and an encoder neural network for a Z coordinate; and
the decoder neural networks include a decoder neural network for the X coordinate, a decoder neural network for the Y coordinate, and a decoder neural network for the Z coordinate.

19. The predictor of claim 18 wherein:
the encoder and the decoder neural networks for the X coordinate are trained independently of the encoder and the decoder neural networks for the y coordinate and independently of the encoder and the decoder neural networks for the Z coordinate; and
the encoder and the decoder neural networks for the Y coordinate are trained independently of the encoder and the decoder neural networks for the Z coordinate.

20. The predictor of claim 14, wherein the prediction labels are multivariate data values indicating a location coordinate and the prediction loss is a regression loss.

21. The predictor of claim 20, further comprising one or more processors configured to apply a weighted neighborhood projection to an absolute coordinate indicated by the multivariate data value of the prediction labels,
wherein the weighted neighborhood projection employs a number of nearest neighbor nodes from a subset of labelled nodes.

22. The predictor of claim 21, wherein the number of nearest neighbor nodes is 2.

* * * * *